(12) United States Patent
Zhang et al.

(10) Patent No.: US 10,136,413 B2
(45) Date of Patent: Nov. 20, 2018

(54) ARO VALUES IN PUCCH RESOURCE ALLOCATION FOR EPDCCH IN TDD

(71) Applicant: NOKIA SOLUTIONS AND NETWORKS OY, Espoo (FI)

(72) Inventors: Li Zhang, Beijing (CN); Timo Erkki Lunttila, Espoo (FI); Esa Tapani Tiirola, Kempele (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 432 days.

(21) Appl. No.: 14/157,972

(22) Filed: Jan. 17, 2014

(65) Prior Publication Data

US 2014/0204810 A1    Jul. 24, 2014

Related U.S. Application Data

(60) Provisional application No. 61/754,260, filed on Jan. 18, 2013.

(51) Int. Cl.
*H04L 5/00* (2006.01)
*H04W 72/04* (2009.01)
(Continued)

(52) U.S. Cl.
CPC ....... *H04W 72/0406* (2013.01); *H04L 1/1861* (2013.01); *H04L 5/0055* (2013.01); *H04L 5/1438* (2013.01)

(58) Field of Classification Search
CPC ... H04W 76/025; H04W 84/12; H04W 88/06; H04W 72/0446; H04W 72/042; H04W 72/0413; H04L 5/14; H04L 5/0055
(Continued)

(56) References Cited

U.S. PATENT DOCUMENTS 8,126,021 B2   2/2012 Wang et al.
2009/0092148 A1   4/2009 Zhang et al.
(Continued)

FOREIGN PATENT DOCUMENTS

CN   101449517 A   6/2009
JP   2015-516125 A   6/2015
(Continued)

OTHER PUBLICATIONS

R1-125069 rim dci based pucch resource allocation alternatives and efficiency.*
(Continued)

*Primary Examiner* — Andrew W Chriss
*Assistant Examiner* — Atique Ahmed
(74) *Attorney, Agent, or Firm* — Squire Patton Boggs (US) LLP

(57) ABSTRACT

Methods, apparatuses, and computer program products for defining ARO values in TDD are provided. One method includes defining acknowledgement (Ack)/negative acknowledgement (Nack) resource offset (ARO) values in time division duplex (TDD) with a first set of values and a second set of values. The first set of values contains negative values and is used to offset hybrid automatic repeat request (HARQ) acknowledgment (ACK) resource determination so that HARQ-ACK is transmitted on physical uplink control channel (PUCCH) resources corresponding to another downlink subframe, and the second set of values contains values between −2 and 2.

6 Claims, 3 Drawing Sheets

(51) Int. Cl.
*H04L 1/18* (2006.01)
*H04L 5/14* (2006.01)

(58) Field of Classification Search
USPC .................................................. 370/280, 329
See application file for complete search history.

(56) References Cited

U.S. PATENT DOCUMENTS

| | | | |
|---|---|---|---|
| 2012/0250663 A1 | 10/2012 | Han et al. | |
| 2013/0322352 A1 | 12/2013 | Han et al. | |
| 2014/0092731 A1 | 4/2014 | Gupta | |
| 2014/0126491 A1* | 5/2014 | Ekpenyong | H04L 5/0055 370/329 |
| 2014/0198737 A1* | 7/2014 | Papasakellariou | H04L 5/0055 370/329 |
| 2015/0341922 A1* | 11/2015 | Han | H04W 52/243 370/280 |

FOREIGN PATENT DOCUMENTS

| | | |
|---|---|---|
| JP | 2015-534394 A | 11/2015 |
| RU | 2340105 C2 | 11/2008 |
| RU | 2454804 C2 | 6/2012 |
| RU | 2470467 C2 | 12/2012 |
| WO | 2012/046883 A1 | 4/2012 |
| WO | 2013/180935 A1 | 12/2013 |
| WO | WO 2014/071304 A1 | 5/2014 |

OTHER PUBLICATIONS

3GPP TSG RAN WG1 Meeting #71 R1-125069, New Orleans, USA, Nov. 12-16, 2012, Title: Efficiency of DCI based PUCCH Resource Allocation Alternatives for ePDCCH, Source: Research in Motion, UK Limited.*
3GPP TSG RAN WG1Meeting #71, R1-125069.*
3GPP TSG RAN WG1 Meeting #71, R1-125069, Dec. 16, 2012 (Year: 2012).*
R1-125069 RIM DCI Based PUCCH Resource Allocation Alternatives and Efficiency, Dec. 16, 2012 (Year: 2012).*
R1-125069; 3GPP TSG RAN WG1 Meeting #71; Research in Motion, UK Limited; "Efficiency of DCI based PUCCH Resource Allocation Alternatives for ePDCCH"; New Orleans, USA, Nov. 12-16, 2012.
R1-125231; 3GPP TSG-RAN WG1 #71; Intel Corporation; "Remaining details on PUCCH resource allocation for EPDCCH"; New Orleans, USA, Nov. 12-16, 2012.
European Search Report application No. 14151525.4 dated Apr. 2, 2014.
Written Opinion dated Mar. 8, 2016, issued in corresponding SG application No. 11201504110Q.
Written Opinion issued in corresponding Singapore Application No. 11201504110Q, dated Nov. 21, 2016.
3GPP TSG RAN Meeting #58, "Enhanced downlink control channel(s) for LTE—core part" RP-121579, Dec. 4-7, 2012. pp. 1-8.
Notification of Reasons for Rejection dated Jul. 4, 2016 corresponding to Japanese Patent Application No. 2015-553083 and English translation thereof.
Alcatel-Lucent, Status Report to TSG [online], RP-121579, 3GPP TSG RAN Meeting #58, Dec. 4-7, 2012, Barcelona, Spain, Nov. 30, 2012, pp. 1-8.
Nokia Siemens Networks et al., "Remaining issues on TDD HARQ-ACK resource allocation for data scheduled via EPDCCH," 3GPP Draft; R1-130475, 3GPP TSG-RAN WG1 Meeting #72, St. Julian's, Malta, Jan. 28-Feb. 1, 2013, Jan. 19, 2013, 5 pages.
Nokia Siemens Networks et al., "Remaining issues on HARQ-ACK resource allocation for data scheduled via EPDCCH: TDD aspects," 3GPP Draft; R1-125011, 3GPP TSG-RAN WG1 Meeting #71, New Orleans, LA, US, Nov. 12-16, 2012, Nov. 2, 2012, 5 pages.
Korean Office Action dated Dec. 18, 2016, issued in corresponding KR Application No. 10-2015-7022080.
Russian Search Report and its English Language Translation dated Nov. 22, 2016, issued in corresponding RU Application No. 2015130844/08.
European Office Action issued in corresponding European Application No. 14151525.4 dated Apr. 6, 2017.
Chinese Office Action and Search Report issued in corresponding Chinese Patent Application No. 201480003947.6 dated Jul. 4, 2017.
Notification of Second Office Action dated Mar. 9, 2018 corresponding to Chinese Patent Application No. 2014800039476 and English translation thereof.
Indonesian Office Action issued in corresponding Indonesian Patent Application No. P00201504671 dated May 23, 2018.

* cited by examiner

ARO VALUES IN PUCCH RESOURCE ALLOCATION FOR EPDCCH IN TDD

CROSS REFERENCE TO RELATED APPLICATIONS

This application claims priority to U.S. Provisional Application No. 61/754,260, filed on Jan. 18, 2013. The entire contents of this earlier filed application is hereby incorporated by reference in its entirety.

BACKGROUND

Field

Embodiments of the invention generally relate to wireless communication systems, such as, but not limited to, the Universal Mobile Telecommunications System (UMTS) Terrestrial Radio Access Network (UTRAN), Long Term Evolution (LTE) Evolved UTRAN (E-UTRAN), and/or LTE-Advanced (LTE-A). Some embodiments may relate to physical uplink control channel (PUCCH) resource allocation for hybrid automatic repeat request (HARQ) acknowledgements (ACKs) corresponding to physical downlink shared channel (PDSCH) transport block.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN) no RNC exists and most of the RNC functionalities are contained in the eNodeB (evolved Node B, also called E-UTRAN Node B).

Long Term Evolution (LTE) or E-UTRAN refers to improvements of the UMTS through improved efficiency and services, lower costs, and use of new spectrum opportunities. In particular, LTE is a 3rd generation partnership project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD). Advantages of LTE are, for example, high throughput, low latency, FDD and TDD support in the same platform, an improved end-user experience, and a simple architecture resulting in low operating costs.

Further releases of 3GPP LTE (e.g., LTE Rel-11, LTE-Rel-12) are targeted towards future international mobile telecommunications advanced (IMT-A) systems, referred to herein for convenience simply as LTE-Advanced (LTE-A). LTE-A is directed toward extending and optimizing the 3GPP LTE radio access technologies. A goal of LTE-A is to provide significantly enhanced services by means of higher data rates and lower latency with reduced cost. LTE-A will be a more optimized radio system fulfilling the international telecommunication union-radio (ITU-R) requirements for IMT-Advanced while keeping the backward compatibility.

SUMMARY

One embodiment is directed to a method including defining acknowledgement (Ack)/negative acknowledgement (Nack) resource offset (ARO) values in time division duplex (TDD) with a first set of values and a second set of values. The first set of values contains negative values and is used to offset hybrid automatic repeat request (HARQ) acknowledgment (ACK) resource determination so that HARQ-ACK is transmitted on physical uplink control channel (PUCCH) resources corresponding to another downlink subframe, and the second set of values contains values between −2 and 2.

According to an embodiment, when m=0, the ARO values are {0, −2, −1, 2}, where m is the relative index of the downlink subframe of the physical downlink shared channel (PDSCH) scheduled by enhanced physical downlink control channel (EPDCCH).

In an embodiment, when m>0, at least one of the first set of values allow for compressing hybrid automatic repeat request (HARQ) acknowledgments (ACKs) to a physical uplink control channel (PUCCH) resource region corresponding to downlink subframe n<m, where m is the relative index of the downlink subframe of the physical downlink shared channel (PDSCH) scheduled by enhanced physical downlink control channel (EPDCCH).

According to an embodiment, at least one of the first set of values results in hybrid automatic repeat request (HARQ) acknowledgments (ACKs) being transmitted on physical uplink control channel (PUCCH) resources corresponding to at least one of downlink subframe n=0 or downlink subframe n=1.

In an embodiment, at least one of the first set of values results in hybrid automatic repeat request (HARQ) acknowledgments (ACKs) being transmitted on physical uplink control channel (PUCCH) resources corresponding to downlink subframe n=m−1, where m is the relative index of the downlink subframe of the physical downlink shared channel (PDSCH) scheduled by enhanced physical downlink control channel (EPDCCH).

Another embodiment is directed to an apparatus including at least one processor, and at least one memory comprising computer program code. The at least one memory and the computer program code are configured, with the at least one processor, to cause the apparatus at least to define acknowledgement (Ack)/negative acknowledgement (Nack) resource offset (ARO) values in time division duplex (TDD) with a first set of values and a second set of values. The first set of values contains negative values and is used to offset hybrid automatic repeat request (HARQ) acknowledgment (ACK) resource determination so that HARQ-ACK is transmitted on physical uplink control channel (PUCCH) resources corresponding to another downlink subframe, and the second set of values contains values between −2 and 2.

Another embodiment is directed to a computer program embodied on a computer readable medium. The computer program is configured to control a processor to perform a process including defining acknowledgement (Ack)/negative acknowledgement (Nack) resource offset (ARO) values in time division duplex (TDD) with a first set of values and a second set of values. The first set of values contains negative values and is used to offset hybrid automatic repeat request (HARQ) acknowledgment (ACK) resource determination so that HARQ-ACK is transmitted on physical uplink control channel (PUCCH) resources corresponding to another downlink subframe, and the second set of values contains values between −2 and 2.

Another embodiment is directed to an apparatus including means for defining acknowledgement (Ack)/negative acknowledgement (Nack) resource offset (ARO) values in time division duplex (TDD) with a first set of values and a second set of values. The first set of values contains negative values and is used to offset hybrid automatic repeat request (HARQ) acknowledgment (ACK) resource determination so that HARQ-ACK is transmitted on physical uplink control channel (PUCCH) resources corresponding to another downlink subframe, and the second set of values contains values between −2 and 2.

BRIEF DESCRIPTION OF THE DRAWINGS

For proper understanding of the invention, reference should be made to the accompanying drawings, wherein.

DETAILED DESCRIPTION

Figure 1:
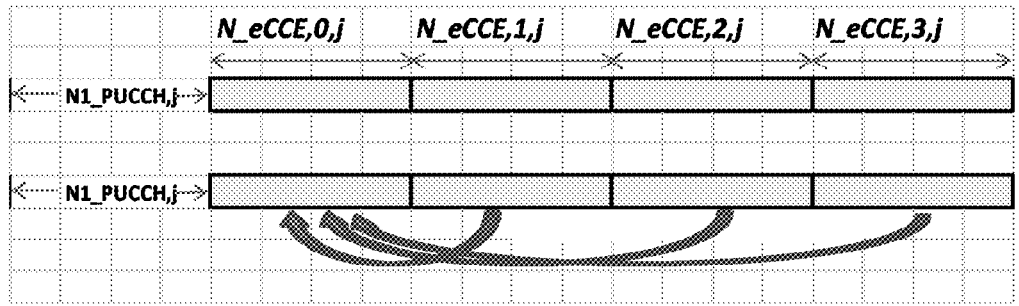
FIG. 1 illustrates an example of a multi-subframe PUCCH resource arrangement, according to an embodiment.

It will be readily understood that the components of the invention, as generally described and illustrated in the figures herein, may be arranged and designed in a wide variety of different configurations. Thus, the following detailed description of embodiments of methods, systems, apparatuses, and computer program products for defining ARO values, as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Some embodiments of the invention relate to physical uplink control channel (PUCCH) resource allocation for HARQ-ACKs corresponding to physical downlink shared channel (PDSCH) transport block.

For frequency domain duplexing (FDD), the PUCCH resource is calculated as a function of acknowledgement (Ack)/negative acknowledgement (Nack) resource offset (ARO). For FDD, one example of the Ack/Nack resource offset may be equal to $\{-2, -1, 0\ 2\}$. A 2-bit Ack/Nack resource offset indication may be present for all the Downlink control information formats that are carried by the enhanced physical downlink control channel (EPDCCH).

However, for Time-domain duplexing (TDD), the 2-bit ARO field is also present but the values for ARO for TDD are not yet defined.

Currently, a tentative proposal has been made in 3GPP that the four ARO values for TDD may be equal to $\{[-2], [-1], 0, 2\}$, where square-bracketed values −2 and −1 are not finalized but the values 0 and 2 have been agreed upon. The problem is how to define the two missing ARO values in a way that PUCCH resources reserved for dynamic HARQ-ACK can be scaled dynamically according to load.

Accordingly, one embodiment provides a method for defining the Ack/Nack resource offset (ARO) values in TDD, to further enable the PUCCH resource compression among multiple DL subframes in a bundle window, as will be discussed in detail below.

PUCCH format 1a/1b resource allocation for HARQ-ACKs corresponding to PDSCH transport block scheduled via EPDCCH has been discussed in the 3GPP RAN1#71 meeting. Several agreements have been made as outlined below with some FFS points.

For FDD, the PUCCH resource $n_{PUCCH}^{(1)}$ is calculated as: $n_{PUCCH}^{(1)} = \Delta_{ARO} + f(n_{eCCE}, p) + N_{PUCCH,j}^{(1)}$, where $\Delta_{ARO} = \{-2, -1, 0, 2\}$ and $N_{PUCCH,j}^{(1)}$ is the PUCCH resource offset associated with EPDCCH set with index T.

Regardless of whether the minimum aggregation level of EPDCCHs in the EPDCCH set is 1 or 2 enhanced control channel elements (ECCE), $f(n_{eCCE}, p)$ is determined for localized and distributed EPDCCH, respectively, as:

$$f(n_{eCCE}, p) = \begin{cases} \text{Localized:} & \lfloor n_{eCCE,j}/N \rfloor \cdot N + k_p \\ \text{Distributed:} & n_{eCCE,j}, \end{cases}$$

where $n_{eCCE,j}$ is the index of the first ECCE of an EPDCCH transmission in the EPDCCH set with index j; N is the number of ECCEs per PRB; $k_p$ is determined from DMRS port used to demodulate EPDCCH; $k_p = \{0, 1, 2, 3\}$ if N=4; $k_p = \{0, 1\}$ if N=2.

Explicit 2-bit Ack/Nack resource offset (ARO) indication is always present in all the DL DCI formats that are carried by EPDCCH. For EPDCCH transmitted on SCell, the resource allocation mechanisms are the same as Rel-10, where Rel-10 ARI is used and the ARO field is set to all zeros. The ARO field may not be included in DCI formats 0 or 4. Regardless of whether Rel-11 UE specific value of $N_{PUCCH}^{(1)}$ for CoMP operation is configured or not, equation 1 above is used for DL grants received on EPDCCH.

For TDD, in the case where the UE is configured to monitor EPDCCH in all the subframes within the same bundling window, in addition to the terms present in the PUCCH resource determination formula for FDD, for TDD the PUCCH resource depends also on:

$$\sum_{i=0}^{m-1} N_{eCCE,i,j},$$

where NeCCE,i,j is equal to the number of eCCEs in subframe in the EPDCCH set j configured for that UE, and m (0 . . . M−1) is the relative index of the DL subframe of the PDSCH scheduled by EPDCCH.

The 2-bit ARO field is present also in TDD. Remaining for further study is the definition of values for ARO for TDD. Some possible example alternatives of ARO values for TDD are:

Alt 1: same as in FDD

Alt 2: $\{0, 2, -NeCCE, m, j, NeCCE, m, j\}$

Alt 3: $\begin{Bmatrix} 0, 2, N(1)PUCCH, 0 - N(1)PUCCH, j, \\ N(1)PUCCH, 1 - N(1)PUCCH, j \end{Bmatrix}$ Alt 4: $\begin{Bmatrix} 0, -NeCCE, 0, j, -(NeCCE, 0, j + NeCCE, 1, j), - \\ (NeCCE, 0, j + NeCCE, 1, j + NeCCE, 2, j) \end{Bmatrix}$ For carrier aggregation, the presence or usage of ARO may be defined similarly as for FDD. For further study is the usage of ARO when DAI>1 and the UE is configured with format 3. Also for further study is when the UE is configured not to monitor EPDCCH in some of the subframes within the same bundling window Some possibilities (square-bracketed aspects are subject to further discussions in RAN1#72) include:
  The four ARO values are {[−2], [−1], 0, 2}, where the values 0 and 2 are agreed upon but the values −2 and −1 are still pending further discussion.
  [The ARO bits are set to zero if DAI>1 and UE is configured with PUCCH format 3]
  [The PUCCH resource allocation is based on all subframes]

The ARO in FDD is designed to solve the potential resource collision between multiple EPDCCH sets sharing the same PUCCH resource region, and the ARO value 0 and 2 in TDD also serve the same purpose. Certain embodiments of the present invention provide solutions to define the ARO values in TDD, to further enable the PUCCH resource compression among multiple DL subframes in the bundle window.

As discussed above, the PUCCH resource allocation for HARQ-ACKs corresponding to PDSCH scheduled via EPDCCH is based partially on implicit mapping. More specifically, there is a one-to-one mapping between the index of the lowest eCCE of the scheduling DL assignment and the PUCCH resource on which HARQ-ACK is transmitted. This results in a situation where the number of PUCCH resources required is equal to the number of eCCEs in the given EPDCCH set j. Additionally, ARO may be used to offset the implicitly derived resource.

FIG. 1 illustrates an example of a multi-subframe PUCCH resource arrangement, according to an embodiment. In TDD, the PUCCH resource overhead is much higher than in FDD because the PUCCH resources for multiple DL subframes in the bundle window are "piled" in one UL subframe, as shown in the upper part of FIG. 1. Since there is no resource interleaving as in LTE Rel-8, one EPDCCH DL assignment allocation in subframe#3 can lead to full UL overhead of subframe#0/1/2 (i.e., N_eCCE.0,j+N_eCCE.1,j+N_eCCE.2,j PUCCH resources need to be reserved, where N_eCCE.m,j is the number of eCCE in the EPDCCH set j in the m-th subframe of the bundling window), no matter how the eCCEs are utilized in these three subframes.

Large negative ARO values could be used to dynamically move the HARQ-ACK resource for DL assignment transmitted in m-th subframe of the bundling window to the PUCCH region corresponding to one of the previous subframes. As shown in the lower part of FIG. 1, for example, for one particular UE, HARQ-ACK resources corresponding to four DL subframes are all moved into PUCCH resources corresponding to the first subframe, thus enabling resource compression among multiple DL subframes in the bundle window.

The resource compression will in turn ensure flexible resource allocation between PUSCH and PUCCH. It is noted that dynamic HARQ-ACK resources are located in the innermost part of PUCCH (next to PUSCH) and being able to compress HARQ-ACK resource dynamically allows for scheduling PUSCH on those physical resource blocks (PRBs) which would otherwise be reserved semi-statically for HARQ-ACK transmitted on PUCCH.

A problem arises in how to specifically define the ARO values in a way that PUCCH resources reserved for dynamic HARQ-ACK can be scaled dynamically according to load (e.g., if the resource utilization in the PUCCH region corresponding the first DL subframe is not high, it should be possible to dynamically move the HARQ-ACK transmission for the following DL subframes to this region).

According to an embodiment, the definition of the ARO for TDD includes two components. One part of ARO is aimed at resource compression and contains large (larger than 2) negative values. This can be used to offset the HARQ-ACK resource determination so that HARQ-ACK ends up being transmitted on PUCCH resources corresponding to another DL subframe. Another part of ARO is aimed at collision avoidance and contains small values (e.g., −2, −1, 0, 1, or 2).

The key properties of the ARO defined according to certain embodiments of the invention can be characterized as follows. When m=0, the ARO definition is reduced to be the same as for FDD, i.e., ARO={−2, −1, 0, 2}. When m>0, at least some of the ARO values allow for compressing HARQ-ACKs to PUCCH resource region corresponding to DL subframe n<m. In one embodiment, at least one ARO value results in HARQ-ACK being transmitted on the PUCCH resources corresponding to DL subframe n=0 and/or n=1. In another embodiment, at least one ARO value results in HARQ-ACK being transmitted on the PUCCH resources corresponding to DL subframe n=m−1 (i.e., on HARQ-ACK resources corresponding to the previous DL subframe).

A generic definition of ARO values in TDD can be described with two sets of parameters {a1, b1, C1} and {a2, b2, C2}, for two ARO values to be decided, respectively. Here, "a" and "b" are used to control to which PUCCH region (corresponding to which DL subframe) the HARQ-ACK resource of target subframe is moved, i.e., "a" and "b" are used for defining the PUCCH resource compression. While "C" is used as an offset for collision avoidance. For example, {"a1", "b1", "C1"} and {"a2", "b2", "C2"} could be dependent on the subframe index "m (0 . . . M−1)", and the combinations of {"a1", "b1", "C1"} and {"a2", "b2", "C2"} determine the two ARO values, respectively.

According to an embodiment, in TDD the ARO values for subframe m are [$O_1$, $O_2$, 0, 2], where:

$$O_1 = \begin{cases} -\sum_{i=a_1}^{b_1} N_{eCCE,i} + C_1, & \text{if } m > a_1 \geq 0 \\ C_1, & \text{otherwise,} \end{cases} \text{ and}$$

$$O_2 = \begin{cases} -\sum_{i=a_2}^{b_2} N_{eCCE,i} + C_2, & \text{if } m > a_2 \geq 0 \\ C_2, & \text{otherwise} \end{cases}$$

Figure 2:
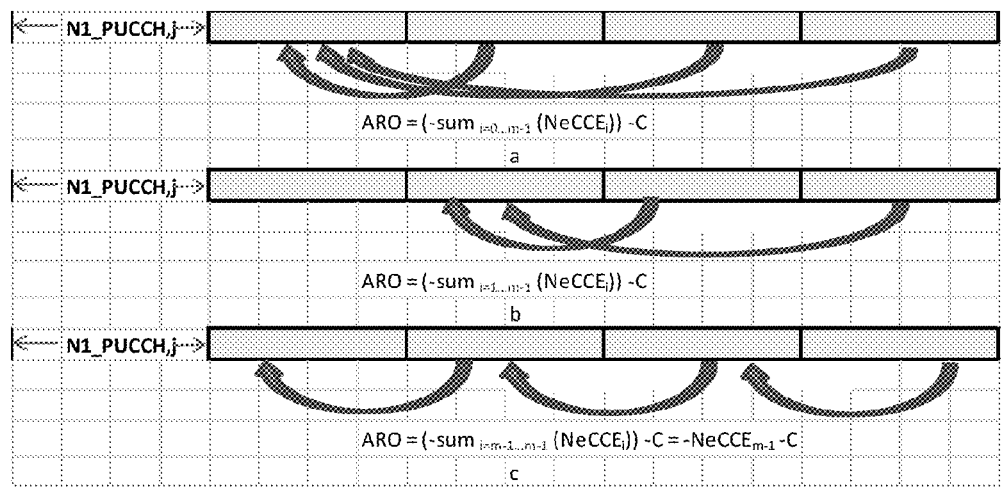
FIG. 2 illustrates an example of multi-subframe PUCCH resource arrangement, according to another embodiment.

FIG. 2 illustrates an example of multi-subframe PUCCH resource arrangement, according to an embodiment. Moving the HARQ-ACK resource corresponding to DL subframe m to subframe n(m>n) can be defined by proper parameter setting for {a,b}. For example:
  a=0, b=m−1 as shown in FIG. 2a, means the HARQ-ACK resources of subframe#1/2/3 are compressed into subframe#0;
  a=1, b=m−1 as shown in FIG. 2b, means the HARQ-ACK resources of subframe#2/3 are compressed into subframe#1;
  a=m−1, b=m−1 as shown in FIG. 2c, means the HARQ-ACK resources of subframe#1/2/3 are compressed into subframe#0/1/2, respectively.

Regarding C, the possibilities for $\{C_1,C_2\}$ may be as follows:
1. $\{C_1,C_2\}$ are constant over all subframes in the bundle window, e.g., $C_1=-2$, $C_2=-1$ or $C_1=0$, $C_2=2$;
2. $\{C_1,C_2\}$ are dependent on the subframe index m,
   2.1. The values for $\{C_1,C_2\}$ are depending on whether the HARQ-ACK resource for current subframe is moved to another subframe, e.g., $$\begin{cases} C_1 = -2, C_2 = -1 \text{ if } m > a \geq 0 \\ C_1 = C_2 = 0 \text{ otherwise} \end{cases}$$

2.2. The interpretation of $\{C_1,C_2\}$ varies from subframe to subframe circularly in the following way:
   m=0: $C_1$ is defined as ARO for FDD ([−2])
   m=1: $C_1$ is defined as [−1]
   m=2: $C_1$ is defined as [0]
   m=3: $C_1$ is defined as [2]
   m=0: $C_2$ is defined as ARO for FDD ([−1])
   m=1: $C_2$ is defined as [0]
   m=2: $C_2$ is defined as [2]
   m=3: $C_2$ is defined as [−2]

The benefit of this approach is that it allows for fully flexible utilization of four ARO values corresponding to the predefined (e.g., the first) subframe. This may be referred to as "circular interpretation" of the offset parameter $\Delta = \{-2, -1, 0, 2\}$. This rule can be written as: $C1=\Delta(m+1)$, $C2=\Delta(\mod(m+x,4)+1)$, where m (0 . . . M−1) is the subframe index within the bundle window, M is the number of subframes in the bundle window, and x is the offset between C1 and C2. In an embodiment, x may have a predefined value, such as 1 or 2 (x=1 was assumed in the example given above).

As mentioned above, the combinations of $\{$"a1", "b1", "C1"$\}$ and $\{$"a2", "b2", "C2"$\}$ may determine the two ARO values, respectively. Certain embodiments may provide different approaches to achieve two distinct values for two ARO values (O1 and O2).

Figure 3:
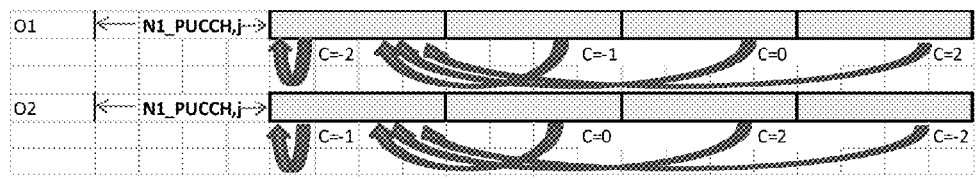
FIG. 3 illustrates one approach for achieving two distinct values for two ARO values, according to an embodiment.

In one embodiment, [a1, b1] is the same as [a2, b2], for example, $$\begin{cases} a_1 = 0, b_1 = m - 1 \\ a_2 = 0, b_2 = m - 1, \end{cases}$$

with circular interpretation of C1 and C2 as in option 2.2 above. This alternative is illustrated in FIG. 3.

Figure 4:
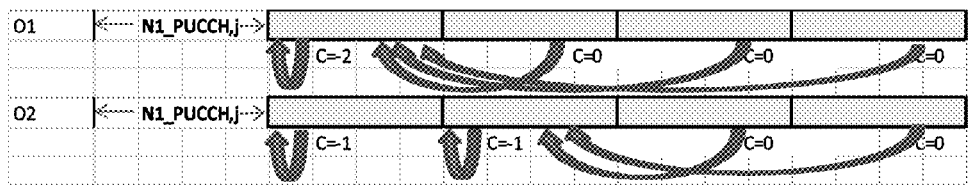
FIG. 4 illustrates another approach for achieving two distinct values for two ARO values, according to an embodiment.

In another embodiment, [a1, b1] is different from [a2, b2], for example $$\begin{cases} a_1 = 0, b_1 = m - 1 \\ a_2 = 1, b_2 = m - 1, \end{cases}$$

with C1 and C2 as in option 2.1 above. This alternative is illustrated in FIG. 4.

Figure 5:
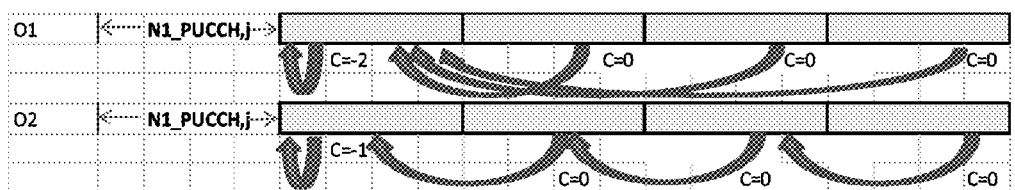
FIG. 5 illustrates another approach for achieving two distinct values for two ARO values, according to an embodiment.

In another embodiment, [a1, b1] is different from [a2, b2], for example $$\begin{cases} a_1 = 0, b_1 = m - 1 \\ a_2 = m - 1, b_2 = m - 1, \end{cases}$$

with C1 and C2 as in option 2.1 above. This alternative is illustrated in FIG. 5.

It should be noted that embodiments are not limited to these combinations, as other combinations of parameter settings beyond the above examples are also possible. It is possible that the system supports only one compressing strategy (e.g., the one depicted in FIG. 3). In another approach, the system may support variable strategies (e.g., the one depicted in FIG. 4 and another depicted in FIG. 5). Following the principle of variable strategies, it is up to the eNodeB to decide the applied strategy. The applied strategy can be configured to the UE via higher layer signalling (such as radio resource control signalling). The signalling can be based (at least partially) on parameters $\{$"a1", "b1", "C1"$\}$ and $\{$"a2", "b2", "C2"$\}$.

Figure 6:
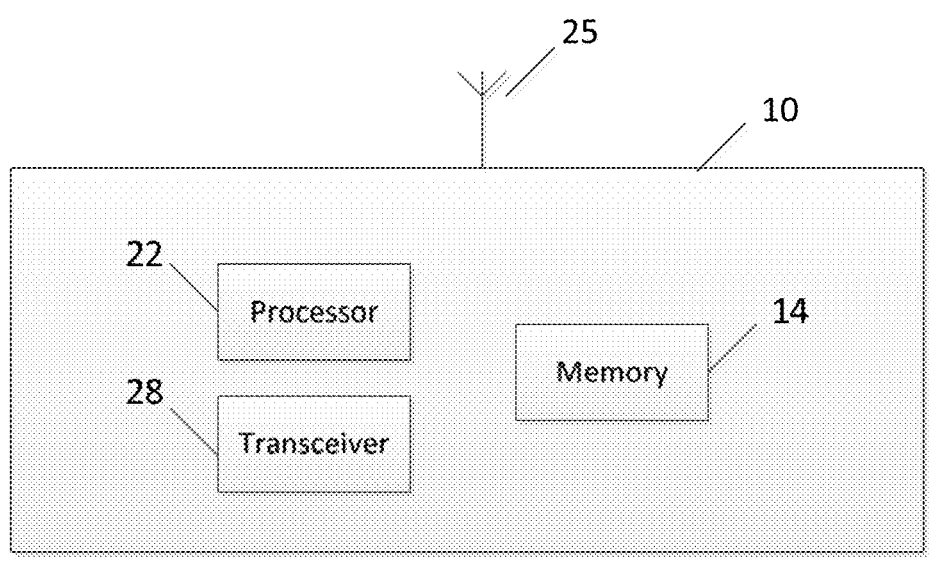
FIG. 6 illustrates an apparatus according to an embodiment.

FIG. 6 illustrates an example of an apparatus 10 according to an embodiment. It should be noted that one of ordinary skill in the art would understand that apparatus 10 may include components or features not shown in FIG. 6. Only those components or feature necessary for illustration of the invention are depicted in FIG. 6.

As illustrated in FIG. 6, apparatus 10 includes a processor 22 for processing information and executing instructions or operations. Processor 22 may be any type of general or specific purpose processor. While a single processor 22 is shown in FIG. 6, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulates information received via the antenna(s) 25 for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In an embodiment, apparatus 10 may be controlled, by memory 14 and processor 22, to define ARO values in TDD with two sets of parameters {a1, b1, C1} and {a2, b2, C2}. In this embodiment, "a" and "b" are used to define the PUCCH resource compression, and "C" is used as an offset for collision avoidance. According to an embodiment, {"a1", "b1", "C1"} and {"a2", "b2", "C2"} could be dependent on the subframe index "m (0 . . . M−1)", and the combinations of {"a1", "b1", "C1"} and {"a2", "b2", "C2"} determine the two ARO values, respectively. In one embodiment, [a1, b1] may be the same as [a2, b2] with a circular interpretation of C1 and C2. In another embodiment, [a1, b1] may be different from [a2, b2] with the values of C1 and C2 depending on whether the HARQ-ACK resource for a current subframe is moved to another subframe. In yet another embodiment, [a1, b1] may be different from [a2, b2] with the values of C1 and C2 varying from subframe to subframe circularly.

Another embodiment may be directed to a method for defining ARO values in TDD. The method may include defining ARO values in TDD with two sets of parameters {a1, b1, C1} and {a2, b2, C2}. According to an embodiment, the method may include using "a" and "b" for defining the PUCCH resource compression, and using "C" as an offset for collision avoidance. According to an embodiment, {"a1", "b1", "C1"} and {"a2", "b2", "C2"} may be dependent on the subframe index "m (0 . . . M−1)", and the combinations of {"a1", "b1", "C1"} and {"a2", "b2", "C2"} determine the two ARO values, respectively. In one embodiment of the method, [a1, b1] may be the same as [a2, b2] with a circular interpretation of C1 and C2. In another embodiment, [a1, b1] may be different from [a2, b2] with the values of C1 and C2 depending on whether the HARQ-ACK resource for a current subframe is moved to another subframe. In yet another embodiment, [a1, b1] may be different from [a2, b2] with the values of C1 and C2 varying from subframe to subframe circularly.

One benefit, according to certain embodiments, is that PUCCH overhead related to PDSCH scheduled via EPDCCH can be minimized. PUCCH overhead is scalable and unoccupied PUCCH resources can be fully utilized for PUSCH. It should be noted that PUCCH overhead is an issue specific for TDD system. If there is no such mechanism built on top of Rel-11 EPDCCH solution, this would mean that EPDDCH results in bigger overhead compared to Rel-8 solution.

In view of the above, in an embodiment, a generic definition of the ARO value in TDD is proposed, which applies to all subframes in the bundle window and covers most of the sensible resource compression methods. Aggressive compression can be achieved with the alternative illustrated in FIG. 3, and collision is further avoided by the circular interpretation. Less aggressive compression can be achieved with the alternatives illustrated in FIGS. 4 and 5. This is a good compromise between compression and dynamic offset among different subframes.

In some embodiments, the functionality of any of the methods described herein, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   receiving, at a user equipment, signaled acknowledgement or negative acknowledgement resource offset values via a higher layer signaling;
   defining the acknowledgement or negative acknowledgement resource offset values in a time division duplex with a first set of values and a second set of values, wherein the first set of values includes negative values;
   compressing, based on the first set of values, physical uplink control channel resources by offsetting hybrid automatic repeat request acknowledgment resource determination,
   wherein the offsetting comprises moving hybrid automatic repeat request acknowledgement being transmitted on the physical uplink control channel resources corresponding to one downlink subframe, to the physical uplink control channel resources corresponding to a previous downlink subframe with respect to the physical uplink control channel resources of a current downlink subframe, wherein the second set of values includes values between −2 and 2;
   transmitting from the user equipment, based at least on the first set of values, the hybrid automatic repeat request acknowledgement on the physical uplink control channel resources;
   wherein, when m=0, the acknowledgement or negative acknowledgment resource offset values are {0, −2, −1, 2}, wherein m is a relative index of the downlink subframe of a physical downlink shared channel scheduled by an enhanced physical downlink control channel, and wherein, when m>0, the method further comprises, based on at least one of the first set of values, compressing the hybrid automatic repeat request acknowledgments to a physical uplink control channel resource region corresponding to downlink subframe n<m, wherein m is a relative index of the downlink subframe of a physical downlink shared channel scheduled by an enhanced physical downlink control channel, and wherein n is the corresponding downlink subframe to which the hybrid automatic repeat request acknowledgement is compressed,
   the method further comprising transmitting, based on at least one of the first set of values, the hybrid automatic repeat request acknowledgments on the physical uplink control channel resources corresponding to at least one of downlink subframe n=0 or downlink subframe n=1.

2. The method according to claim 1, further comprising:
transmitting, based on at least one of the first set of values, the hybrid automatic repeat request acknowledgments on the physical uplink control channel resources corresponding to downlink subframe n=m−1.

3. An apparatus, comprising:
at least one processor; and
at least one memory including computer program code,
wherein the at least one memory and the computer program code are configured, with the at least one processor, to cause the apparatus at least to:
receive, at a user equipment, signaled acknowledgement or negative acknowledgement resource offset values via a higher layer signaling;
define the acknowledgement or negative acknowledgement resource offset values in a time division duplex with a first set of values and a second set of values, wherein the first set of values includes negative values;
compress, based on the first set of values, physical uplink control channel resources by offsetting hybrid automatic repeat request acknowledgment resource determination,
wherein the offsetting comprises moving hybrid automatic repeat request acknowledgement being transmitted on the physical uplink control channel resources corresponding to one downlink subframe, to the physical uplink control channel resources corresponding to a previous downlink subframe with respect to the physical uplink control channel resources of a current downlink subframe, wherein the second set of values includes values between −2 and 2;
transmit from the user equipment, based at least on the first set of values, the hybrid automatic repeat request acknowledgement on the physical uplink control channel resources,
wherein, when m=0, the acknowledgement or negative acknowledgment resource offset values are {0, −2, −1, 2}, wherein m is a relative index of the downlink subframe of a physical downlink shared channel scheduled by an enhanced physical downlink control channel, and wherein, when m>0, the at least one memory and the computer program code are further configured, with the at least one processor, to cause the apparatus at least to, based on at least one of the first set of values, compress the hybrid automatic repeat request acknowledgements to a physical uplink control channel resource region corresponding to downlink subframe n<m, wherein m is a relative index of the downlink subframe of a physical downlink shared channel scheduled by an enhanced physical downlink control channel, and wherein n is the corresponding downlink subframe to which the hybrid automatic repeat request acknowledgement is compressed;
wherein the at least one memory and the computer program code are further configured, with the at least one processor, to cause the apparatus at least to, based on at least one of the first set of values, transmit the hybrid automatic repeat request acknowledgments on the physical uplink control channel resources corresponding to at least one of downlink subframe n=0 or downlink subframe n=1.

4. The apparatus according to claim 3, wherein the at least one memory and the computer program code are further configured, with the at least one processor, to cause the apparatus at least to, based on at least one of the first set of values, transmit the hybrid automatic repeat request acknowledgments on the physical uplink control channel resources corresponding to downlink subframe n=m−1.

5. A computer program, embodied on a non-transitory computer readable medium, the computer program, when executed by a processor, causes the processor to:
receive, at a user equipment, signaled acknowledgement or negative acknowledgement resource offset values via a higher layer signaling;
define the acknowledgement or negative acknowledgement resource offset values in a time division duplex with a first set of values and a second set of values, wherein the first set of values includes negative values;
compress, based on the first set of values, physical uplink control channel resources by offsetting hybrid automatic repeat request acknowledgment resource determination,
wherein the offsetting comprises moving hybrid automatic repeat request acknowledgement being transmitted on the physical uplink control channel resources corresponding to one downlink subframe, to the physical uplink control channel resources corresponding to a previous downlink subframe with respect to the physical uplink control channel resources of a current downlink subframe, wherein the second set of values includes values between −2 and 2;
transmit from the user equipment, based at least on the first set of values, the hybrid automatic repeat request acknowledgement on the physical uplink control channel resources,
wherein, when m=0, the acknowledgement or negative acknowledgment resource offset values are {0, −2, −1, 2}, wherein m is a relative index of the downlink subframe of a physical downlink shared channel scheduled by an enhanced physical downlink control channel, and wherein, when m>0, the computer program, when executed by the processor, further causes the processor to, based on at least one of the first set of values, compress the hybrid automatic repeat request acknowledgments to a physical uplink control channel resource region corresponding to downlink subframe n<m, wherein m is a relative index of the downlink subframe of a physical downlink shared channel scheduled by an enhanced physical downlink control channel, wherein n is the corresponding downlink subframe to which the hybrid automatic repeat request acknowledgement is compressed,
wherein the computer program, when executed by the processor, further causes the processor to, based on at least one of the first set of values, transmit the hybrid automatic repeat request acknowledgments on the physical uplink control channel resources corresponding to at least one of downlink subframe n=0 or downlink subframe n=1.

6. The computer program according to claim 5, wherein the computer program, when executed by the processor, further causes the processor to, based on at least one of the first set of values, transmit hybrid automatic repeat request acknowledgments on the physical uplink control channel resources corresponding to downlink subframe n=m−1.

* * * * *